Sept. 4, 1962 H. H. SCHWARTZ 3,051,975
HAND HELD SNOW AND ICE REMOVAL EQUIPMENT
Filed June 11, 1956
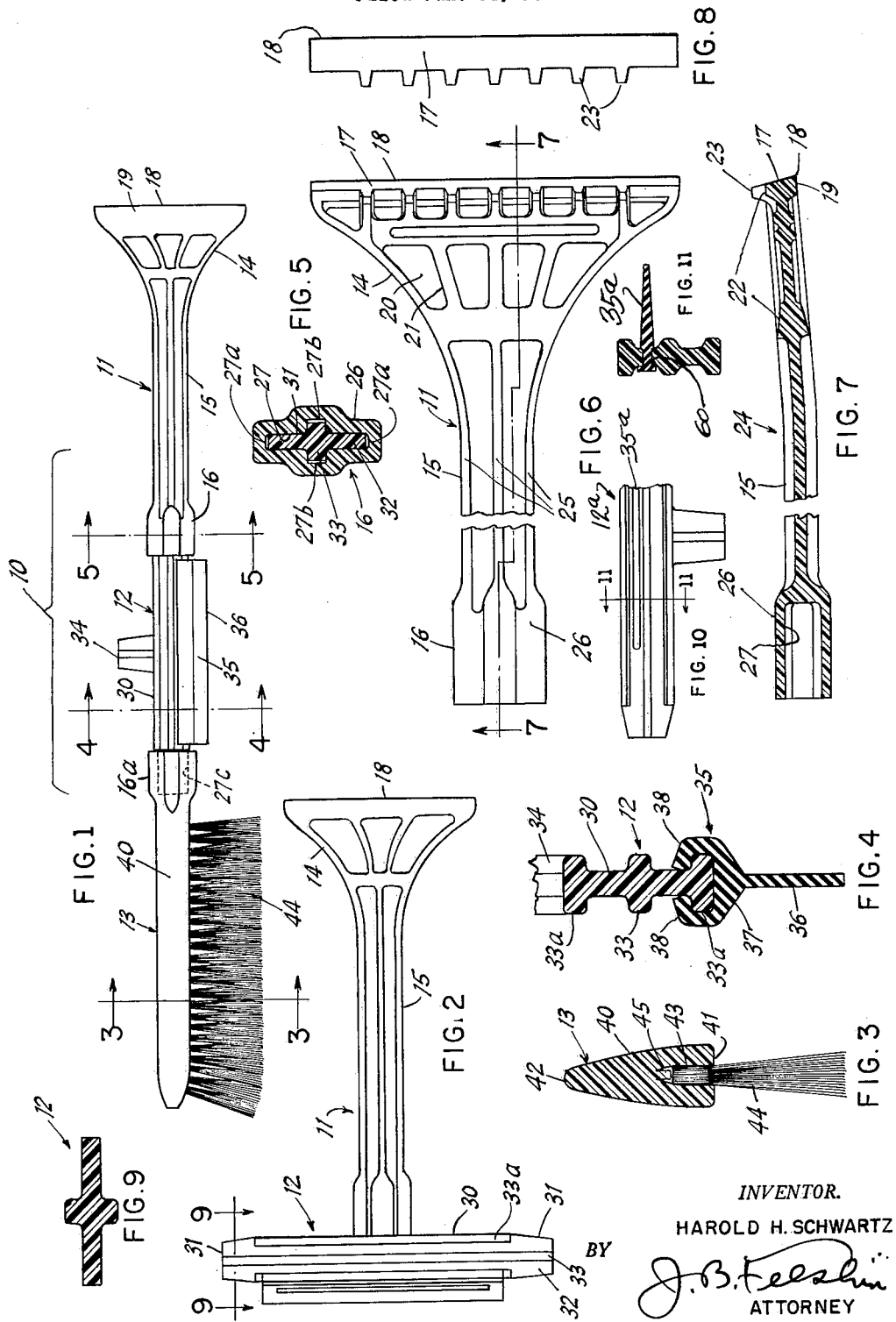
INVENTOR.
HAROLD H. SCHWARTZ
BY
*J. B. Felshin*
ATTORNEY United States Patent Office
3,051,975
Patented Sept. 4, 1962

1

3,051,975
HAND HELD SNOW AND ICE REMOVAL
EQUIPMENT
Harold H. Schwartz, Port Chester, N.Y., assignor to Empire Brushes, Inc., Port Chester, N.Y., a corporation of New York
Filed June 11, 1956, Ser. No. 590,483
2 Claims. (Cl. 15—105)

This application relates to hand held snow and ice removal equipment for use in an automobile or similar application.

A common problem found in connection with the use of automobiles in northern climates has been the limiting of visibility by the accumulation of snow and ice on windshield, side and rear windows of an automobile. It is therefore desirable to remove all snow and ice which has accumulated prior to using an automobile, and stops may be made at intervals for further removal of ice and snow on extended tours under extremely adverse conditions. To the end of removing frozen precipitation from the glass surfaces of an automobile, three common devices have been evolved.

The first is the automobile defroster which is a combination fan and heating unit employed to blow warm air on the inside of the windshield. These, however, do not have the heating capacity required to melt driven snow and sleet piling up on the front of the windshield, and the warm air tends to fog up the inside of the windshield, thus further lowering visibility. Also they take time to warm up.

Secondly, windshield wipers may be used to brush soft snow from the windshield, however, the rush of snow and cold air upon a windshield will soon cause a layer of ice to stick to the windshield and build up about the windshield wiper arm and freeze it fast.

The third common method of snow removal is by means of a small hand held scraping edge used to push away packed snow which has built up on a windshield of a car since the previous use thereof. It is in this category that the present invention lies.

Previous embodiments of hand-held ice scrapers have been formed with short handles and a beveled front end with a sharp scraping edge or a squeegee substituted for the scraping edge. Several shortcomings of the common ice scrapers lie in the fact that the leading edge is too narrow in width to quickly remove loose snow which has been well built up; the scraping edge, though suitable for removing thin sheets of soft ice, is not adequate for quickly removing thick layers of hard ice which must be broken up into small pieces before it can be scraped away; and the handles of previous scrapers or squeegees have been too short to comfortably reach a center portion of the windshield or the rear window.

It is therefore an object of this invention to provide a combination ice scraper and squeegee which shall be provided with a scraper for cracking and chipping away ice, and a squeegee for wiping-clear water, snow or ice from the outside glass areas of an automobile.

Another object of this invention is to provide a combination scraper and squeegee which shall have fittings or interconnections of the several parts thereof.

It is a further object of this invention to provide a scraper and squeegee combination as described, wherein the several parts may be interengaged so as to form a long handle for extending the scraper portion thereof with the squeegee attached; and wherein the scraper portion may be connected to the squeegee portion for use as a handle therefor; and wherein the scraper unit may be used separately; and wherein all the several parts may be disengaged and fitted into a storage space which is smaller in length than the length of the assembled parts.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention.

FIG. 1 is a plan view of the assembled device embodying the invention;

FIG. 2 is a side plan view of the ice scraper and squeegee combination;

FIG. 3 is a cross-sectional view taken on the line 3—3 of FIG. 1;

FIG. 4 is a cross-sectional view taken on the line 4—4 of FIG. 1;

FIG. 5 is a cross-sectional view taken on the line 5—5 of FIG. 1;

FIG. 6 is a plan view of the underside of the ice scraper;

FIG. 7 is a cross-sectional view taken on the line 7—7 of FIG. 6;

FIG. 8 is an end plan view of the ice scraper;

FIG. 9 is a cross-sectional view taken on the line 9—9 of FIG. 2;

FIG. 10 is a partial front elevational view of a squeegee member embodying a modification; and FIG. 11 is a cross-sectional view taken on line 11—11 of FIG. 10.

Referring now in detail to the drawings, the completely assembled device 10 comprises three main sections; an ice scraper 11, a squeegee 12, and a snow brush 13.

The ice scraper 11 is formed with a head portion 14, an elongated straight handle portion 15 extending from said head portion, and a socket portion 16 formed at the other end of the handle 15. The head portion 14 has a wide, flat forward edge surface 17 which slopes forward at an angle to form a pointed edge 18 where surface 17 meets the underside surface 19. Surface 19 is the underside surface of the scraper head and may be formed with indentations 20 and ribs 21 for lightening and reinforcement.

Side 22 opposite side 19 may also be formed with similar indentations and reinforcing ribs. A number of ice breaker teeth 23 are formed extending upwardly from side 22 adjacent end edge surface 17. The head 14 tapers and narrows towards the handle 15 at the point where the head meets the handle. The head 14 is inclined slightly upwardly from neck 24 as shown in FIG. 7 so that the ribs outlining the head can rest flat against a surface being scraped while the handle is at an angle to said surface to permit ease in grasping the handle and to afford space for the handle to lie between the surface being scraped and the handle. The handle 15 is of uniform width and extends from the head portion 14 for any predetermined length. The handle 15 is formed with three parallel ribs 25 connected by center webs, and said ribs and webs joining a built up portion 26 at the socket 16. Socket 16 as seen in FIG. 5 is formed of a thick wall 26 and has an internal opening 27 in the form of a cross shaped slot having aligned slot portion 27a, and aligned transverse slot portion 27b.

The center squeegee section 12 (see FIG. 1) is formed with an elongated base portion 30 similar in cross-section to portion 15 of the ice scraper section 11. At each end of the elongated portion 30 of the squeegee 12, is a plug or tab end 31 as shown in FIG. 2. The tab ends are formed with a broad, flat, centerpiece 32 received in slot portion 27a and short cross ribs 33 which extend the length of the elongated portion 30 and the ends of which are received in slot portion 27b. The tabs 31 are of a size and shape to fit into opening 27 of the socket 16 of the ice scraper 11.

Extending outwardly from the mid-portion of the squeegee is a third tab 34 similar to tabs 32. On the opposite side of the elongated portion 30 from the tab 34 is located the squeegee blade 35 (FIG. 4). The squeegee blade 35 is formed with a blade end 36 which is used for wiping, a base 37 which abuts one edge of the elongated portion 30, and overlap portions 38 which surround one of the outer ribs 33a of the elongated portion 30. The squeegee 35 may be fastened to the elongated base portion 30 by gluing, stapling, or any other suitable means, or it may be frictionally fitted in place.

The third portion 13 is a snow brush. The snow brush is formed at one end with a socket 16a which forms internal cross-slot shaped 27c similar to slot 27. Said brush comprises an elongated, tapered brush back 40. The brush back 40 is thicker at the bristle side 41 than at the top side 42. The brush back is approximately equal in length to the ice scraper 11. A row of openings 43 are formed along the bottom side 41 of the brush back 40. Tufts of bristles 44 are crimped therein and secured with staples 45.

Any or all of the parts 11, 12 and 13 may be made of plastic or any other suitable material. The squeegee blade 35 may be made of rubber or a suitable plastic, such as vinyl or polyethylene. The bristles 44 of the brush 13 may be of hair, fiber, or any suitable plastic such as nylon.

The tabs 31 of the squeegee may be placed one in socket 16 of the ice scraper and one in socket 16a of the snow brush thereby forming a long handle. In this way, the ice scraper may be used on the windshield or rear window of an automobile without undue inconvenience from having to lean over the hood or trunk section of the automobile. By having a long handle formed of the several parts of the invention, the necessity of walking from one side of the automobile to another in order to clean both sides of the windshield is greatly reduced, though this may be necessary with extremely curved windshields.

By gripping the brush base 40, the ice scraper 11 may be used at a distance. By gripping the handle 15, the snow brush may be used to brush loosely packed snow or recently chipped ice from the windshield, rear window, and top of the car.

When using a defroster when driving, the inside of the windshield is known to fog up with condensation of the inside air. In this case, the short tab 34 at the mid-portion of the squeegee portion 12 is inserted into the socket 16 of the ice scraper 11. The ice scraper thereby forms a convenient handle for the squeegee which may be used to wipe off excess moisture on the inside surface of the windshield. Of course, the ice scraper unit 11 or the snow brush 13 may be used separately merely by gripping the sockets 16. The ice scraper 11 is provided with teeth 23 for cracking and breaking up sheets of ice which form from snow which has been driven onto the windshield, melted by the warmed glass and then refrozen by the rush of cold air while driving. The broad, sharp edge 18 of the ice scraper is used conveniently to push aside hard snow or thin sheets of ice.

The three parts of the device, the ice scraper, the squeegee, and the brush may be packaged in a plastic envelope (not illustrated) which will fit inside the glove compartment of an automobile. None of the parts, 11, 12 or 13 should be any greater in length than an average glove compartment.

In FIGS. 10 and 11 there is shown a modified form of squeegee member 12a which may replace member 12, is similar to member 12 except that it is formed with a longitudinal slot 60 in which is inserted a squeegee member 35a at right angles to member 12a.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination, an ice scraper comprising a member having an elongated shank, an ice scraping head at the front end of the shank and crossing the same, a socket at the rear end of the shank, an elongated member having a socket at its forward end similar and symmetrically disposed with respect to the first mentioned socket, and an intermediate elongated member having similar symmetrically disposed plugs at the opposite ends thereof received within said sockets, whereby to attach said ice scraper, said elongated member and said intermediate member in longitudinal alignment, said intermediate member being formed with a plug extending at right angles therefrom and shaped to fit either of said sockets.

2. In combination, a surface scraper comprising a member having an upper side away from the surface to be scraped and an underside toward the surface to be scraped, said member comprising an elongated shank, a head extending from the forward end of said shank and being wider than said shank and extending to opposite sides thereof, said head being inclined away from the underside of said shank, the underside of said head being inclined upwardly and forwardly of the shank and adapted to contact the surface to be scraped, while the shank is inclined away from said surface, and having, at its forward end, a forwardly inclined surface extending to the underside of said head and forming an angle of less than 90° therewith to provide a scraping edge therewith, and said head being formed at the upper side thereof, adjacent the forward end thereof, with teeth.

References Cited in the file of this patent

UNITED STATES PATENTS

| | | |
|---|---|---|
| 194,042 | Jackson | Aug. 14, 1877 |
| 1,450,612 | Schultz | Apr. 3, 1923 |
| 1,658,706 | Carrot | Feb. 7, 1928 |
| 2,517,247 | Seley | Aug. 1, 1950 |
| 2,639,454 | Dory | May 26, 1953 |
| 2,772,430 | Moritt | Dec. 4, 1956 |
| 2,792,584 | Fryda | May 21, 1957 |
| 2,856,621 | Racicot | Oct. 21, 1958 |

FOREIGN PATENTS

| | | |
|---|---|---|
| 83,854 | Switzerland | June 16, 1920 |
| 537,979 | France | Mar. 11, 1922 |